US012261931B2

United States Patent
Chan et al.

(10) Patent No.: US 12,261,931 B2
(45) Date of Patent: Mar. 25, 2025

(54) METHOD AND APPARATUS FOR PROVISIONING NODE-LOCKING CONFIDENTIAL DATA

(71) Applicant: ARRIS Enterprises LLC, Suwanee, GA (US)

(72) Inventors: Tat Keung Chan, San Diego, CA (US); Alexander Medvinsky, San Diego, CA (US); Rafie Shamsaasef, San Diego, CA (US); Fariba Barez, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 232 days.

(21) Appl. No.: 18/107,902

(22) Filed: Feb. 9, 2023

(65) Prior Publication Data

US 2023/0269066 A1    Aug. 24, 2023

Related U.S. Application Data

(60) Provisional application No. 63/308,442, filed on Feb. 9, 2022.

(51) Int. Cl.
*H04L 9/00* (2022.01)
*H04L 9/08* (2006.01)
*H04L 9/32* (2006.01)
*H04L 9/40* (2022.01)

(52) U.S. Cl.
CPC ............ *H04L 9/006* (2013.01); *H04L 9/0891* (2013.01); *H04L 9/3247* (2013.01); *H04L 9/3268* (2013.01); *H04L 63/06* (2013.01)

(58) Field of Classification Search
CPC ..... H04L 63/06; H04L 9/3247; H04L 9/3268; G06F 21/105
See application file for complete search history.

(56) References Cited

U.S. PATENT DOCUMENTS

| 9,130,928 | B2* | 9/2015 | Qiu ........................ H04L 63/06 |
| 10,162,944 | B2* | 12/2018 | Makam ................ G06F 21/105 |
| 2013/0091353 | A1* | 4/2013 | Zhang ................... H04L 9/3268 |
| | | | 713/156 |
| 2014/0281497 | A1 | 9/2014 | Medvinsky et al. |
| 2021/0390189 | A1* | 12/2021 | Nagao ................... H04L 9/3247 |

OTHER PUBLICATIONS

International Search Report and Written Opinion RE: Application No. PCT/US23/12735, dated May 19, 2023.

* cited by examiner

*Primary Examiner* — Barbara B Anyan
(74) *Attorney, Agent, or Firm* — Chernoff, Vilhauer, McClung & Stenzel, LLP

(57) ABSTRACT

A system and method for provisioning confidential data such as unique credentials is described. The technique initializes a whitebox cryptographic software module to a particular PKI client to soft-lock whitebox cryptographic operations to the particular PKI client and uniquely encrypting the credentials with a node-locking key (NLK) derivable from a digital certificate.

20 Claims, 10 Drawing Sheets

METHOD AND APPARATUS FOR PROVISIONING NODE-LOCKING CONFIDENTIAL DATA

CROSS-REFERENCE TO RELATED APPLICATIONS

The present application claims priority to U.S. Provisional App. No. 63/308,442 filed Feb. 9, 2022, the content of which is incorporated herein by reference in its entirety.

BACKGROUND

1. Field

The present disclosure relates to systems and methods for communicating data, and in particular to a system and method for provisioning node-locking confidential data.

2. Description of the Related Art

Security credentials allow the secure provision of data and the control of devices that are in use by customers. However, many devices have no pre-existing security credentials, for example, many Internet of Things (IoT) devices and 5G base stations implementing virtual network functions running on cloud computing environments, typically lack such pre-installed credentials. There is a need to securely provide such credentials to remote devices or software instances running on virtual computing platforms, and to secure such credentials to prevent their use on unauthorized devices or platforms.

SUMMARY

To address the requirements described above, this document discloses a system and method for performing an cryptographic operation according to a device-unique private key. In one embodiment, the method comprises: providing, in a PKI client, a whitebox implementation, the whitebox implementation comprising a global whitebox decryptor; a locked whitebox encryptor, the locked whitebox encryptor locked to the PKI client according to a PKI client unique ID; a locked whitebox decryptor, the locked whitebox decryptor locked to the PKI client according to the PKI client unique ID. The method also comprises receiving: an encoded global encryption key; the private key encrypted according to the global encryption key; a digital certificate cryptographically associated with the private key; decrypting the encrypted private key according the encoded global encryption key using the global whitebox decryptor; deriving node locking information from the digital certificate; uniquely re-encrypting the private key according to the node locking information by the locked whitebox encryptor; re-deriving the node locking information from the digital certificate; decrypting the re-encrypted private key according to the re-derived node locking information by the locked whitebox decryptor; and performing the cryptographic operation according to the decrypted private key.

Another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

Figure 1:
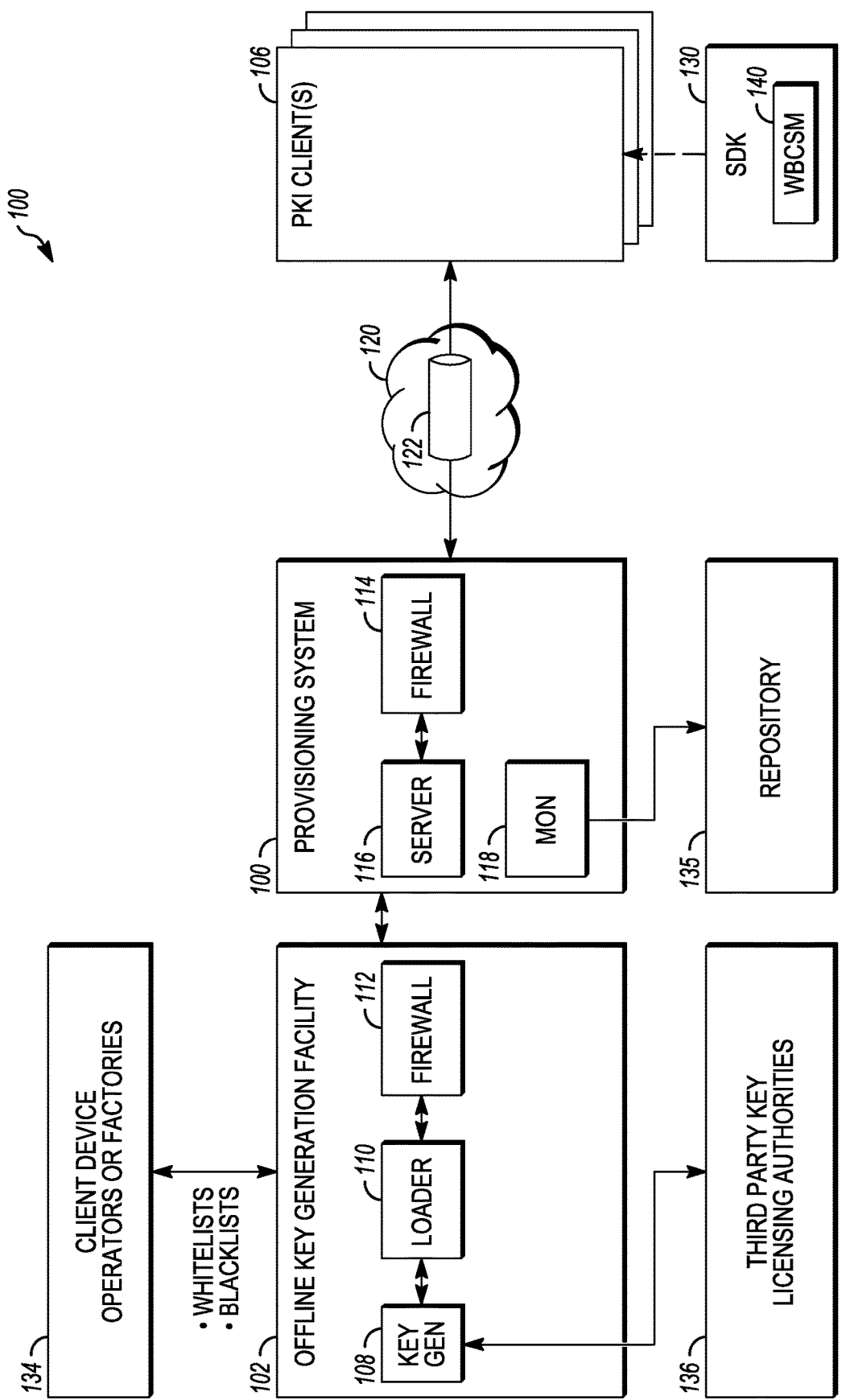
FIG. 1 is a diagram depicting a secure data delivery system.

In the following description, reference is made to the accompanying drawings which form a part hereof, and which is shown, by way of illustration, several embodiments. It is understood that other embodiments may be utilized and structural changes may be made without departing from the scope of the present disclosure.

Overview

As described above, there is a need to provide secure data such as security credentials to remote devices. Such devices can include hardware devices disposed at remote locations or software instances disposed at the locations that are running on virtual platforms. In the description that follows, such remote devices are referred to as "PKI clients."

After the security credentials are provisioned, they remain subject to abuse, for example by copying the credentials and using them on other (and unauthorized) PKI clients. This can be ameliorated by node-locking the provisioned credentials to the PKI client by uniquely encrypting them so as to be only decryptable on the desired PKI client(s). This prevents the credential from being copied and used on a different PKI client.

While such techniques are useful, they typically require a removable or embedded hardware security module (HSM) such as for example a TPM (Trusted Platform Module) chip. However, HSMs are generally not suitable for PKI clients which are deployed in a cloud environment consisting of ubiquitous off-the-shelf hardware. Further, PKI clients which are deployed as appliances may be designed with portability in mind to run on off-the-shelf hardware without an HSM component. In cases where use of HSMs is undesirable, software obfuscation and whitebox cryptography can be used to both deliver the secure data and to encrypt the data so it cannot be used elsewhere. Once provisioned, such secure data may be stored locally or used for secure sockets layer (SSL), transport layer security (TLS) transactions, Internet Protocol Security (IPSec), or any other applications or communication protocols that make use of digital certificates.

Node-locking restricts the operation of a cryptographic processing to a specific node (e.g. processor, set of processors, PKI client or application instances) to mitigate code-lifting attacks. Such code-lifting attacks may occur, for example, when the implementation is moved from an authorized node to an unauthorized one. Typically, node-locking using HSMs requires that unique credentials (such as a private key and digital certificate) be provisioned to the node, and uniquely encrypted to the client instance, so that the credentials cannot be copied and used on a different node or elsewhere.

A technique for provisioning confidential data such as unique credentials is described below. This technique can be used with PKI clients with no pre-existing security credentials. Instead, the technique uses global credentials as a bootstrap to provision the unique credentials to the PKI client. After the unique credentials are provisioned, the credentials are uniquely encrypted to the PKI client, so that the credentials cannot be copied and used on a different instance or another PKI client. Once suitably protected by encryption, they may be stored locally or used in SSL, TLS transactions, IPSec, or any other applications or communication protocols that make use of digital certificates.

The technique takes advantage of two features: (1) initializing a whitebox cryptographic software module to a particular PKI client to soft-lock selected whitebox cryptographic operations (e.g. decryption/encryption) to the particular PKI client, and (2) uniquely encrypting the credentials before locally storing them with a node-locking key (NLK) derivable from a digital certificate, optionally using one of the soft locked whitebox cryptographic operations as described in U.S. Provisional Patent Application Ser. No. 63/290,191, entitled "White-Box Soft-Locking," by Aaron Anderson and Fariba Barez, filed Dec. 16, 2021 (hereby incorporated by reference herein), then decrypting the credentials with a rederived NLK when the credentials are needed.

Referring first feature, soft-locking the whitebox encryptor/decryptor implementations to the particular PKI client is accomplished by initializing a whitebox cryptographic software module using a unique identifier (ID) of the PKI client. The whitebox encryption and decryption implementations that are created using the initialized whitebox cryptographic software module are cryptographically tied to the unique ID, and hence, the PKI client itself. The unique ID represents a "fingerprint" of the PKI client that can be derived from locally collected information such as the hardware and/or software characteristics of the PKI client or platform unique associations given by a cloud provider such as Docker container ID or a Virtual Network Function (VNF) ID. After such initialization using the unique ID, any operations performed using the resulting initialized whitebox cryptographic software module will be unique to that instance or PKI client. Therefore, if the same data and key are copied to a different instance or PKI client, the encryption/decryption operations will provide incorrect results and will be unusable.

The second feature, unique encryption of the credentials using a node-locking key (NLK) for the particular PKI client, prevents use of the credentials on other devices. The NLK is derived from the provisioned digital certificate rather than being stored Therefore, in order to make use of NLK on another unauthorized client instance, the digital certificate used to derive NLK would also have to be copied to that same client instance. When digital certificate includes client identifying information such as a media access control (MAC) Address, internet protocol (IP) address or fully qualified domain name (FQDN), its use on an unauthorized client instances with a different identifier can be rejected due to this mismatch.

Unique encryption of the credentials using with the NLK includes two use cases. The first use case is a "clear key access" use case in which, a clear (unencoded and unencrypted) private key is produced for use by the application executed by the PKI client. In this case, the private key is decrypted for use by the application, and later deleted when operations requiring the private key are completed. This case can be used, for example, when an application requires use of a clear (unencrypted) version of the private key. The second user case is a protected use case in which the private key is protected by encoding even when used by the application. In this case, the application executed by the PKI client includes a whitebox operation that requires that the private key be encoded for use only with that particular whitebox implementation of the operation. In this embodiment, a clear version of the private key is not exposed at any time in either volatile or persistent memory. The first use case can be implemented with any custom or standard cryptographic protocol such as IPsec or TLS. The second use case is a more secure implementation that can be applied to the same set of secure protocols, also including IPsec and TLS.

Online Credential Provisioning System

FIG. 1 is a diagram depicting a secure data delivery system 100. The secure data delivery system 100 comprises a key generation facility 102 communicatively coupled to an online credential provisioning system 104 (hereinafter referred to as "provisioning system"), which is communicatively coupled to one of a plurality of PKI clients 106. The key generation facility 102 interfaces with client operators and/or the factory 134 that builds and provisions the PKI clients 106 to provide whitelists and/or blacklists that indicate which PKI clients 106 should receive or should not receive credentials, and which PKI client 106 should have credentials revoked. The key generation facility 102 may generate its own key pairs (e.g. a private key and associated public key) using key generator 108, or may obtain such keys from a third party key licensing authority 136. The key loader 110 prepares these key pairs for transmission to the provisioning system 104 via firewall 112. The provisioning system 104 comprises a key provisioning server 116 that accepts the generated key pairs from the key generation facility 102, and performs the operations described below to prepare them for provisioning to the PKI client 106 via firewall 114.

The communication link between the provisioning system 104 and the client 106 is typically implemented by the Internet 120 using an authenticated and encrypted tunnel 122 such as secure sockets layer (SSL) or IPsec-based virtual private network (VPN). The provisioning system 104 may also include a module 118 that monitors the provision of the credentials and reports such provision activity to a repository 135. A software development kit (SDK) 130, which may include a whitebox cryptographic software module (WBCSM) 140 is installed on the PKI client 106 to perform the PKI client 106 operations described herein. In other embodiments, the WBCSM 140 installed on the PKI client 106 separate from the SDK 130. The PKI client 106 also may perform applications at least partially implemented in the cloud. An example of such a PKI provisioning system without the use of whitebox cryptography is described in U.S. Pat. No. 9,130,928, which is hereby incorporated by reference herein. The WBCSM 140 is a crypto-tool that uses whitebox cryptography techniques to generate and implement white-box processing. In one embodiment, the WBCSM 140 provides common cryptographic operations such as symmetric/asymmetric encryption/decryption as well as signing and verification operations, all protected using whitebox cryptography.

Figure 2:
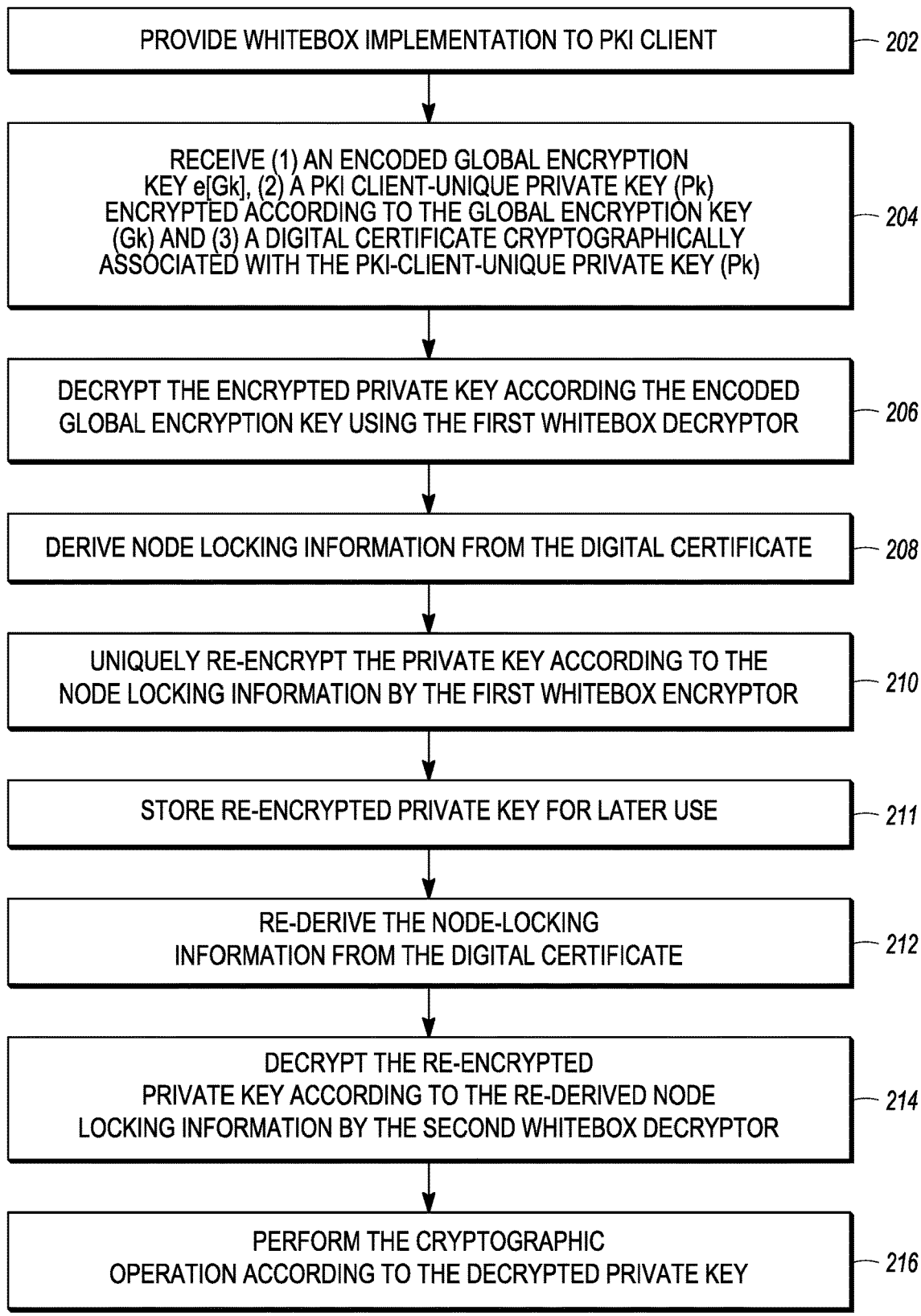
FIG. 2 is a diagram illustrating exemplary operations that can be used to provision credentials to the client.

FIG. 2 is a diagram illustrating exemplary operations that can be used to provision credentials to the PKI client 106. In block 202, a whitebox implementation is provided to the PKI client 106. The whitebox implementation includes a global whitebox decryptor (an embodiment of which is illustrated as item 316 of FIG. 3), a locked whitebox encryptor (an embodiment of which is illustrated as item 408 of FIG. 4), and a locked whitebox decryptor (an embodiment of which is illustrated as item 414 of FIG. 4). As further described below, the locked whitebox encryptor 408 and the locked whitebox decryptor 414 are node-locked to the PKI client 106 according to PKI client-unique identifier, as further described below. The global whitebox decryptor 316 is not node-locked to a particular PKI client 106, and thus can be used by any one of a plurality of PKI clients 106.

In one embodiment, the whitebox decryptor 414 as well as whitebox encryptor 408 are both locked to a unique PKI client by initializing the WBCSM 140 according to a unique identifier (ID) of the PKI client 106. This initialization causes the WBCSM 140 to generate look up tables (LUTs) that are "locked" to the PKI client 106 or node executing the whitebox implementation. The LUTs of the locked whitebox implementation differ from the LUTs of an unlocked whitebox implementation in that the node-locked LUTs are derived from the unique ID or fingerprint of the node include random bijections derived from unique ID. Hence, node-locked LUTs will only generate the proper output if the inputs (e.g. keys and possibly other information) provided to the whitebox implementation are encoded properly for that node-locked LUT. Similarly, if a key encoded for one whitebox implementation is provided to a different whitebox implementation, the resulting output will differ and not perform the desired cryptographic operation to arrive at the desired result.

An example of how such LUTs are generated and used is provided in U.S. Provisional Patent Application Ser. No. 63/290,191, entitled "White-Box Soft-Locking," by Aaron Anderson and Fariba Barez, filed Dec. 16, 2021, which is hereby incorporated by reference herein.

In block 204, the PKI client 106 receives an encoded global encryption key e[Gk] 312, a PKI-client unique private key Pk 302 that is encrypted according to the global encryption key Gk 306 and a digital certificate 304 that is cryptographically associated with the PKI-client unique private key Pk 302 (e.g. the digital certificate was generated from the PKI-client unique private key).

In block 206, the PKI client 106 receives the encoded global encryption key 312, the encrypted private key 314, and the digital certificate 304, and decrypts the encrypted private key 314 according to the encoded global encryption key 312 using the global whitebox decryptor 316.

Figure 4:
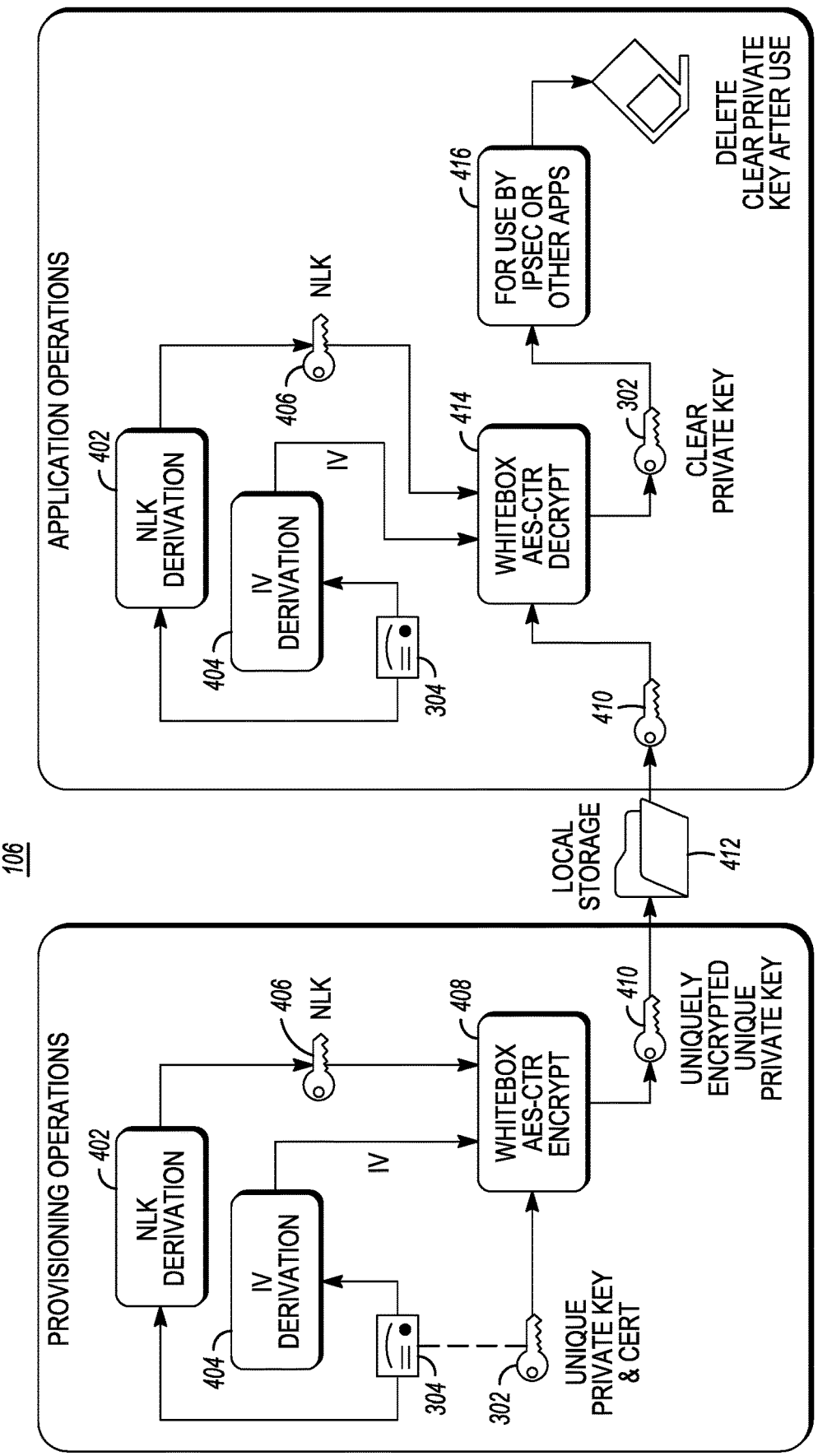
FIG. 4 is a diagram illustrating a second phase of credential provisioning and the decryption and use of the provisioned private key.

In block 208, node locking information is derived from the digital certificate 304. This node locking information is to be distinguished from node-locking of the locked whitebox encryptor 408 and the locked whitebox decryptor 414. As further described below, the node locking of the locked whitebox encryptor 408 and the locked whitebox decryptor 414 is accomplished by generating transformations and whitebox LUTs having random bijections using information that identifies the PKI-client 106 (e.g. a PKI-client unique ID), while the node locking information derived from the digital certificate 304 includes the NLK and an optional Initialization Vector (IV) which are both utilized to locally encrypt the private key 302 with the locked whitebox encryptor 408 for later use with a target application. As shown in FIG. 4, the NLK and/or IV are derived during provisioning operations, and before encryption, may be vulnerable to unauthorized access. To prevent this, the NLK and/or IV may be treated following this derivation as already whitebox-encoded form for use in the application operations. In this embodiment, clear values of NLK and/or IV are not exposed at any time.

In block 210, the private key 302 is uniquely re-encrypted by the locked whitebox encryptor 408 according to the node locking information generated from the digital certificate 304. In block 211, that re-encrypted private key is stored in local storage 412 for later use.

In block 212, the node locking information is re-derived from the node-locking information of the digital certificate 304.

In block 214, the re-encrypted private key 410 is decrypted according to the re-derived node-locking information by the locked whitebox decryptor 414. Finally, a cryptographic operation is performed by the PKI client according to the decrypted private key 302.

In one embodiment, the operations of blocks 212 and 214 are invoked only right before the clear private key 302 is required by the application 416 (e.g., TLS handshake), and all copies of the clear private key 302 are deleted securely immediately after use. Secure data deletion may for example be based on the DoD 5220.22-M method for data erasure. Such deletion can be performed immediately after the private key 302 is used in a computation, after a configurable delay to account for the possibility that the application will again need access to the private key 302, after it is known that further access to the private key 302 by the current instance of the application is not required, or when the application 416 completes execution.

Figure 3:
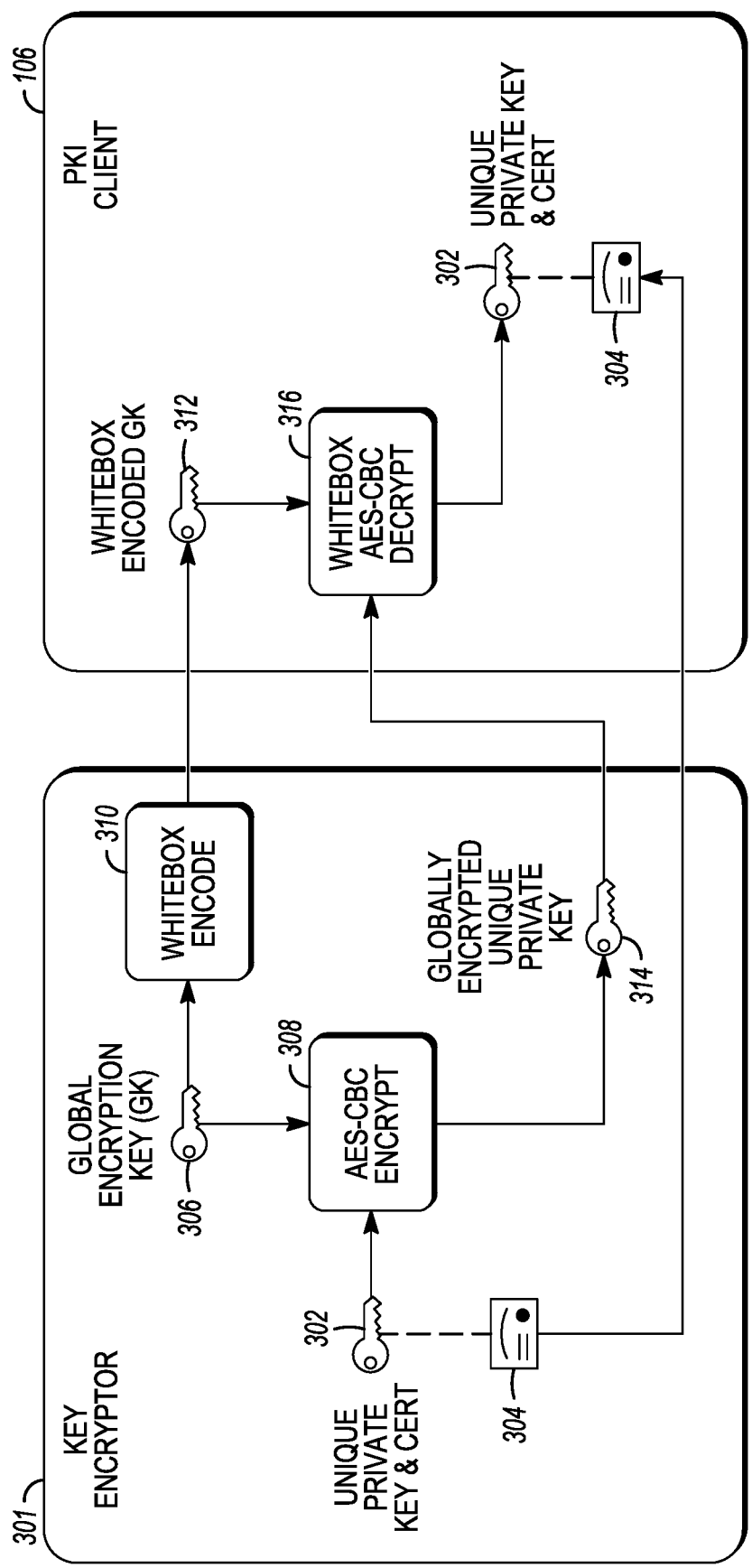
FIG. 3 is a diagram illustrating a first phase of credential provisioning.

FIG. 3 is a diagram illustrating one embodiment of the operations performed in blocks 204 and 206. The PKI-client unique private key 302 and digital certificate 304 are generated, for example, by the key generator 108. A key encryptor 301, which may be included in the offline key generation facility 102 or the provisioning system 104, encrypts the private key 302 using encryptor 308. Although the encryptor 308 may be implemented using whitebox techniques, this is not necessary, as the encryption is not performed in the cloud or by field deployed devices, and may therefore be performed in a secure environment.

The global encryption key 306 is encoded by a whitebox encoder 310 to modify the global encryption key 306 so as to be usable by the whitebox decryptor 316 executed by the PKI client 106 to decrypt the global encryption key 306 that was encrypted by the encryptor 308. The encoded global encryption key 312, the globally encrypted private key 314, and the digital certificate 304 are provided to the PKI client 106.

FIG. 3 illustrates an embodiment in which the encryption and decryption operations utilize Advanced Encryption Standard Cipher Block Chaining (AES-CBC) algorithms, but other algorithms may be utilized.

FIG. 4 is a diagram illustrating a first embodiment of a second phase of credential provisioning and the decryption and use of the provisioned private key 302 by the PKI client 106. The operations depicted represent further details regarding the operations of blocks 208-216 depicted in FIG. 2, in which the private key 302 is re-encrypted, stored, and decrypted for use by the PKI client 106.

In this case, unique encryption is applied to the private key 302 before storage of the private key 302 for later use. When needed, that re-encrypted private key 302 is retrieved and decrypted to produce a cleartext private key 302 that is used to perform one or more cryptographic operations of a client application 416. Accordingly, this embodiment represents a "clear key access" use case in which a cleartext private key 302 is produced in the PKI client 106.

In the embodiment illustrated in FIG. 4, the node-locking information derived in block 208 of FIG. 2 includes a node-locking key (NLK) and optionally an initialization vector (IV). For illustrative purposes, the IV is derived by an IV derivation module 404, and the NLK 406 is derived by NLK derivation module 402, but a single module may generate both the IV and the NLK 406, as further described below.

Figure 5:
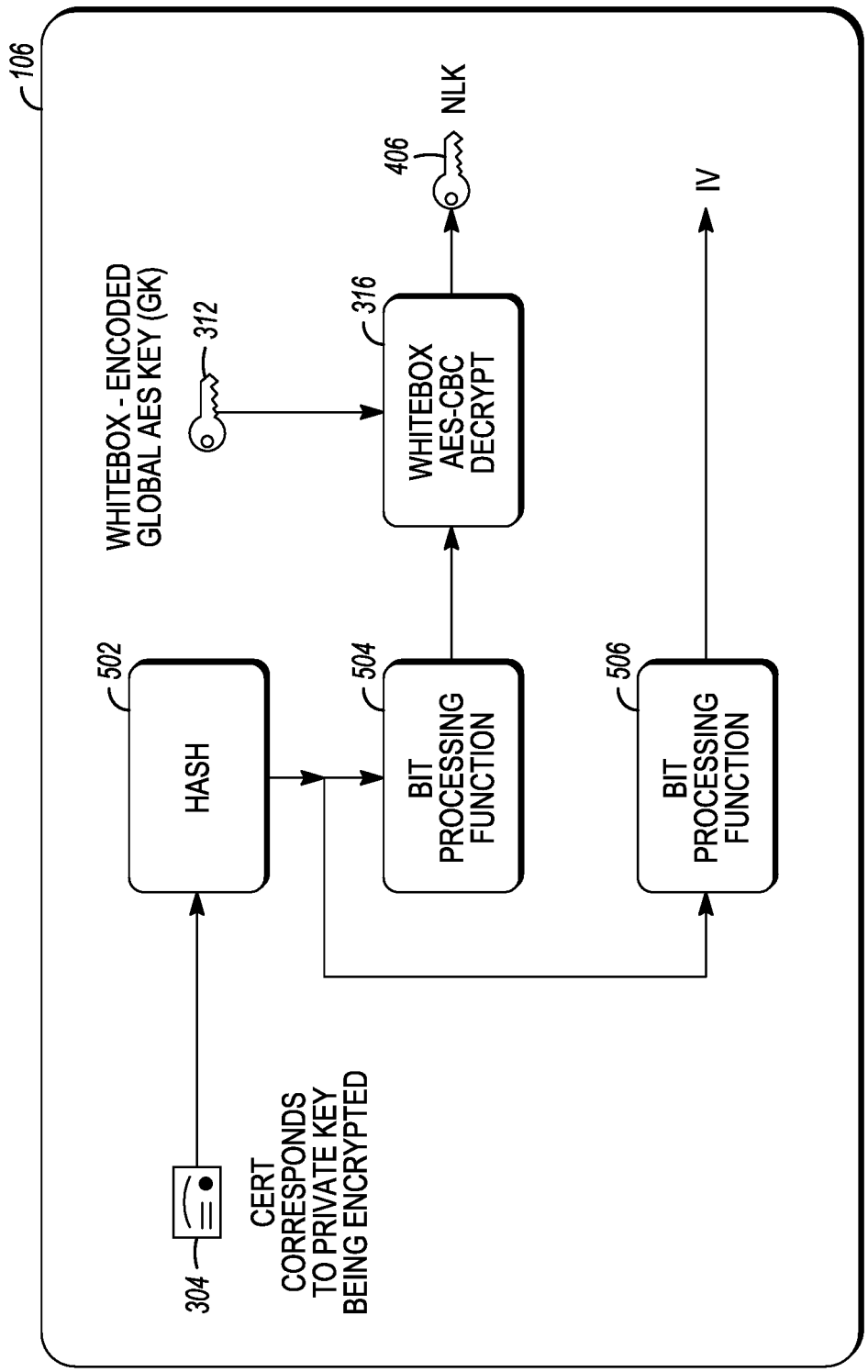
FIG. 5 is a diagram illustrating one embodiment of how node-locking information may be generated.

FIG. 5 is a diagram illustrating one embodiment of how the NLK 406 and IV may be generated. Block 502 performs a cryptographic hash operation of the digital certificate 304 corresponding to the private key 302. Block 506 can be any mathematical function that computes the IV containing the suitable number of bits. For example, an IV for AES must have exactly 128 bits. In the illustrated embodiment, block 506 computes the least significant bits of the hash to produce the IV, but the function in block 506 may output more bits than are required followed by a bit reduction function. The output of block 506 may optionally be considered as IV which is already in whitebox-encoded format such that the clear IV will never be exposed in memory. Block 506 may compute the IV and/or the NLK in encoded form, so as to be applied to whitebox decryptor 414. In this embodiment, the IV/NLK is never available in unencoded or unencrypted form and is therefore less subject to compromise.

Block 504 is another bit generating function applied to the hash value produced by block 502. This function generates enough bits to constitute a cryptographic key utilized by the whitebox encryptor 408. In one embodiment, the result of block 504 is first passed in as data into whitebox decryptor 316 to perform a decryption operation according to the encoded global encryption key e[Gk] 312 to produce the NLK 406 which can then be utilized by whitebox encryptor 408. In the illustrated embodiment, the output of 504 is decrypted according to the encoded global encryption key e[Gk] according to an AES-CBC decrypt operation, but other decryption schemes may be utilized. As illustrated, the same global encryption key 306 and whitebox decryptor 316 are used to protect the private key 302 when first provisioned to the PKI client 106 may be used to generate the NLK 406. This embodiment of the NLK 406 may be represented as:

NLK=AES-CBC-Decrypt(GK, Bit Processing Function (Hash(Cert))).

Although FIG. 5 discloses generating the NLK 406 and the IV from the certificate 304 using bit processing functions 504 and 506 and global whitebox decryptor 316, other formulations can be used so long as the values derived from the digital certificate 304 are sufficiently secure and re-derivable when needed.

Returning to FIG. 4, to perform the unique encryption of the private key 302 according to the node locking information described in block 210 of FIG. 2, the NLK 406 and IV is applied to locked whitebox encryptor 408, which encrypts the private key 302 to produce the re-encrypted private key 410. The re-encrypted private key 410 is then stored in storage 412.

When use of the private key 302 is desired, the re-encrypted private key 410 and digital certificate 304 is retrieved from storage 412. The node-locking information is re-derived using the same operations outlined above in FIG. 5, and this re-derived node-locking information is used to decrypt the re-encrypted private key 410 using a locked whitebox decryptor 414. This locked whitebox decryptor 414 is configured to decrypt data that has been encrypted by locked whitebox encryptor 408 using the NLK 406 and IV. In the illustrated embodiment, since the information was encrypted by a whitebox encryptor in the AES-CTR mode and SL enabled, the re-encrypted private key 410 is decrypted using a whitebox decryptor in an AES-CTR mode using the IV and NLK derived above. The result is the recovered private key 302, which can be used by applications implemented in the PKI client 106. Although blocks 408 and 414 illustrate unique encryption and decryption respectively utilizing AES-CTR (AES in counter mode) algorithm, any other cryptographic encryption/decryption algorithm could be used in its place with the unique IV and NLK 406.

Note that the node-locking information is derived instead of randomly generated, thus avoiding the need to store the node-locking information. The process of generating the node-locking information is repeatable on similar devices or cloud nodes however tightly coupled to the locked whitebox encryptor 408 and whitebox decryptor 414 may be to that device. Note also that the node-locking information is derived using corresponding digital certificate 304, and since each private key 302 will be associated with a different digital certificate 304, each private key 302 will have different node-locking information for encrypting the private key 302. Further note that the NLK 406 is derived by and hence coupled with the global whitebox decryptor 316, and as a result, the NLK 406 cannot be used with standard AES-CTR decryption techniques to extract the private key 302.

In the embodiments discussed above, the NLK 406 and IV are generated as shown in FIG. 5, and after generation in both provisioning and application operations, are potentially available in cleartext form, and subject to compromise. To prevent this outcome, the value of NLK 406 or IV or both are computed so as to be encoded for use directly (in encoded form) by whitebox encryptor 408 and decryptor 414.

Figure 6:
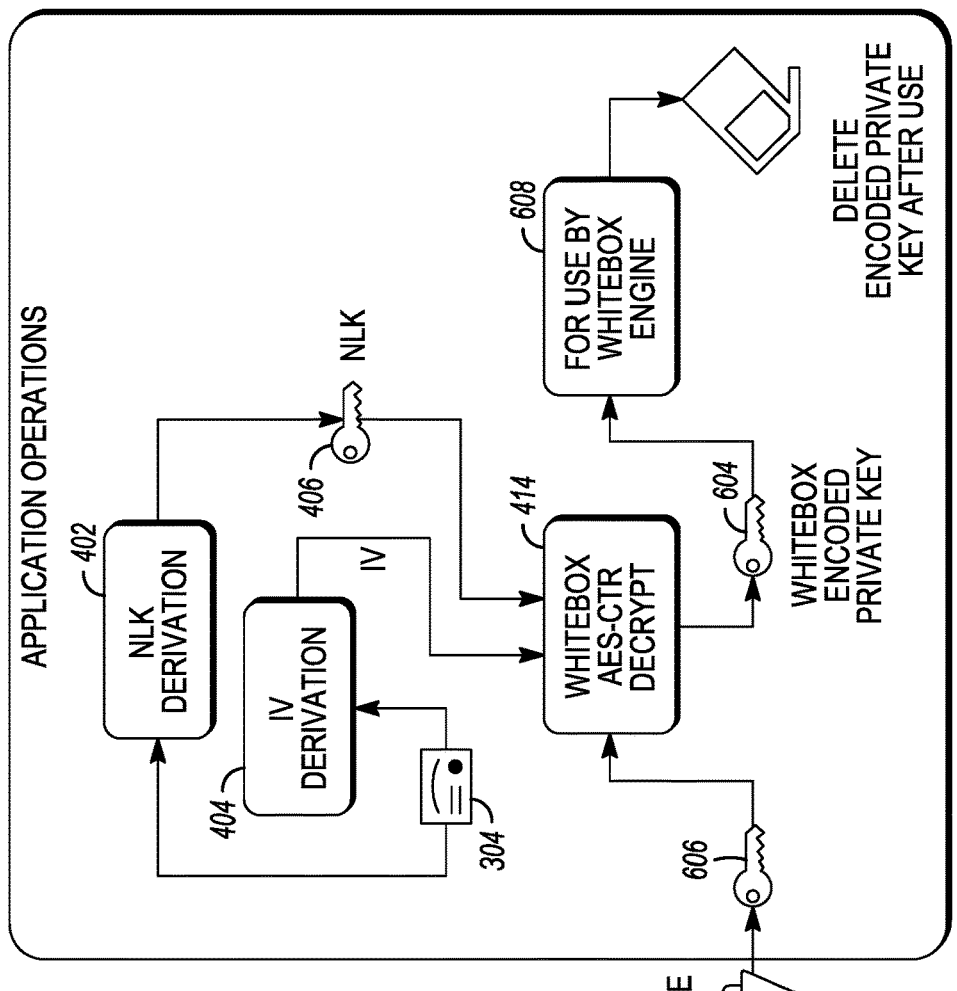
FIG. 6 is a diagram illustrating another embodiment of the second phase of credential provisioning, and the decryption and use of an encoded version of the private key.
Figure 6:
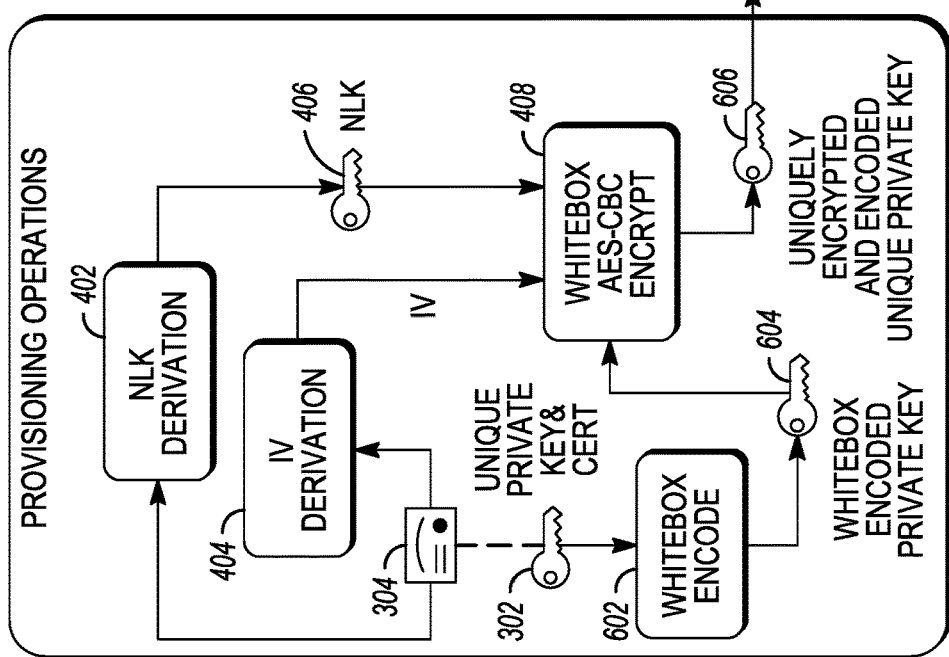

FIG. 6 is a diagram illustrating another embodiment of the second phase of credential provisioning, and the decryption and use of an encoded version of the private key 302. This represents a "protected key" use case in which a cleartext private key 302 not available to the PKI client 106 during application operations. Rather, an encoded version of the private key 302 (henceforth, the "encoded private key" 604) is produced for use by whitebox operations in the PKI client 106, and a clear version of the private key 302 available only after the first stage of provisioning operations. In this embodiment, the unique private key (Pk) 302 is encoded for use by a whitebox cryptographic operation 608 of the initialized WBCSM 140 following decryption with the re-derived node-locking information.

As was the case in the "clear key access" embodiment illustrated in FIG. 5, the "protected key" embodiment derives node-locking information from the digital certificate 304, including the IV and the NLK 406. However, in this embodiment, before the private key 302 is encrypted according to whitebox encryptor 408, the private key 302 is encoded by encoder 602 to produce a whitebox encoded private key 604. Using the re-derived node locking information, that whitebox encoded private key 604 is then uniquely re-encrypted by the locked whitebox encryptor 408 to arrive at a uniquely encrypted and encoded private key 606. This unique encryption is itself locked to a particular PKI client 106, because the WBCSM 140 that implements the locked whitebox encryptor 408 and the locked whitebox decryptor 414 was initialized according to the are unique ID of the PKI client 106, thereby locking the whitebox encryptor 408 and the whitebox decryptor 414 to the particular PKI client 106. In other words, only the WBCSM 140 initialized and bound to that PKI client 106 according to the unique ID of the PKI client 106 can decrypt and recover the encoded and encrypted private key 606.

This encrypted encoded private key 606 is then placed in local storage 412 for later use. When use of the encoded private key 604 is desired, the node-locking information is re-derived from the digital certificate 304, by the NLK derivation module 402 and the IV derivation module 404, and the node-locking information is used to decrypt the encrypted encoded private key 606 to recover the encoded private key 604. The encoded private key 604 may be used to perform the whitebox cryptographic operation 608 for which the private key 302 was encoded.

The encoded private key 604 may be globally encoded (e.g. encoded for use by a whitebox cryptographic operation 608 that is implemented on all of the plurality of PKI client 106) or uniquely encoded for a whitebox cryptographic operation 608 of a node-locked WBCSM 140 initialized to a specific PKI client 106. If the private key 302 is globally encoded, it can be used by all instances running the same WBCSM 140 that is bound to the same global random seed.

If the encoded private key 604 is soft-locked to a particular WBCSM 140 (e.g. initialized with the unique identifier of that PKI client 106), it can only be used with the WBCSM 140 initialized and bound to that PKI client 106. This option provides further protection, and this embodiment reduces the risk of retaining the encoded private key 604 for later use.

Figure 7:
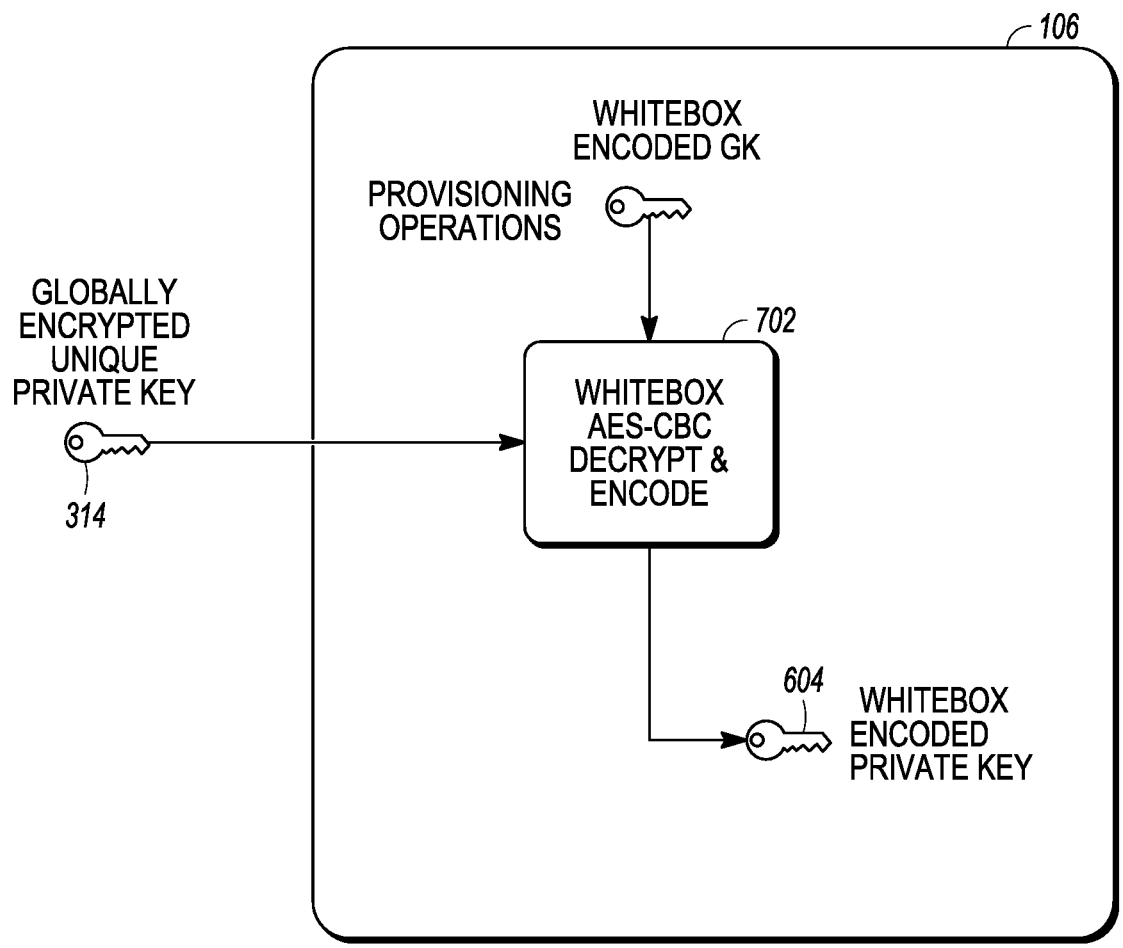
FIG. 7 is a diagram illustrating another alternative embodiment of the provisioning and use of the private key.

FIG. 7 is a diagram illustrating another alternative embodiment of the provisioning and use of the private key 302. In this embodiment, the whitebox implementation further comprises a whitebox cryptographic operation, and in addition to the decryption operation, the global whitebox decryptor of FIG. 7 further encodes the private key for use by that whitebox cryptographic operation. Thus, the global decryption and encoding of the private key 302 to produce the encoded private key 604 by the PKI client 106 for use by the initialized WBCSM 140 is combined to a single operation performed by global whitebox decryptor and encoder 702 (e.g. by application of a single LUT implementing both decryption and encoding).

The encoded private key 604 is then saved and uniquely encrypted according to the node locking information, just as was the case in the embodiment illustrated and described with respect to FIG. 6. This reflects an embodiment, with still further security, as the clear private key 302 is not exposed within the PKI client 106 at any time, including during provisioning operations.

Figure 8:
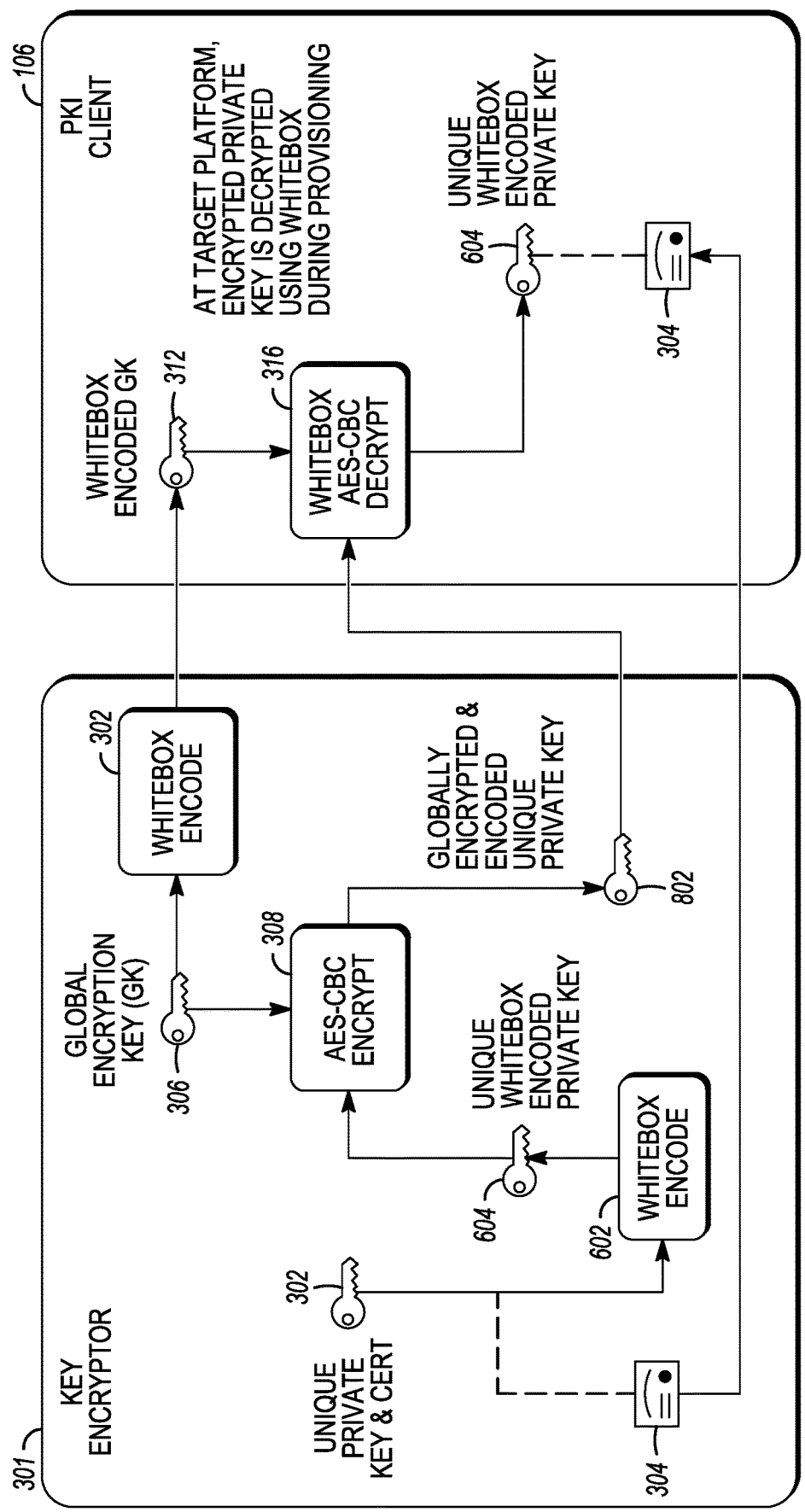
FIG. 8 is a diagram illustrating the first phase of a further embodiment of credential provisioning.
Figure 9:
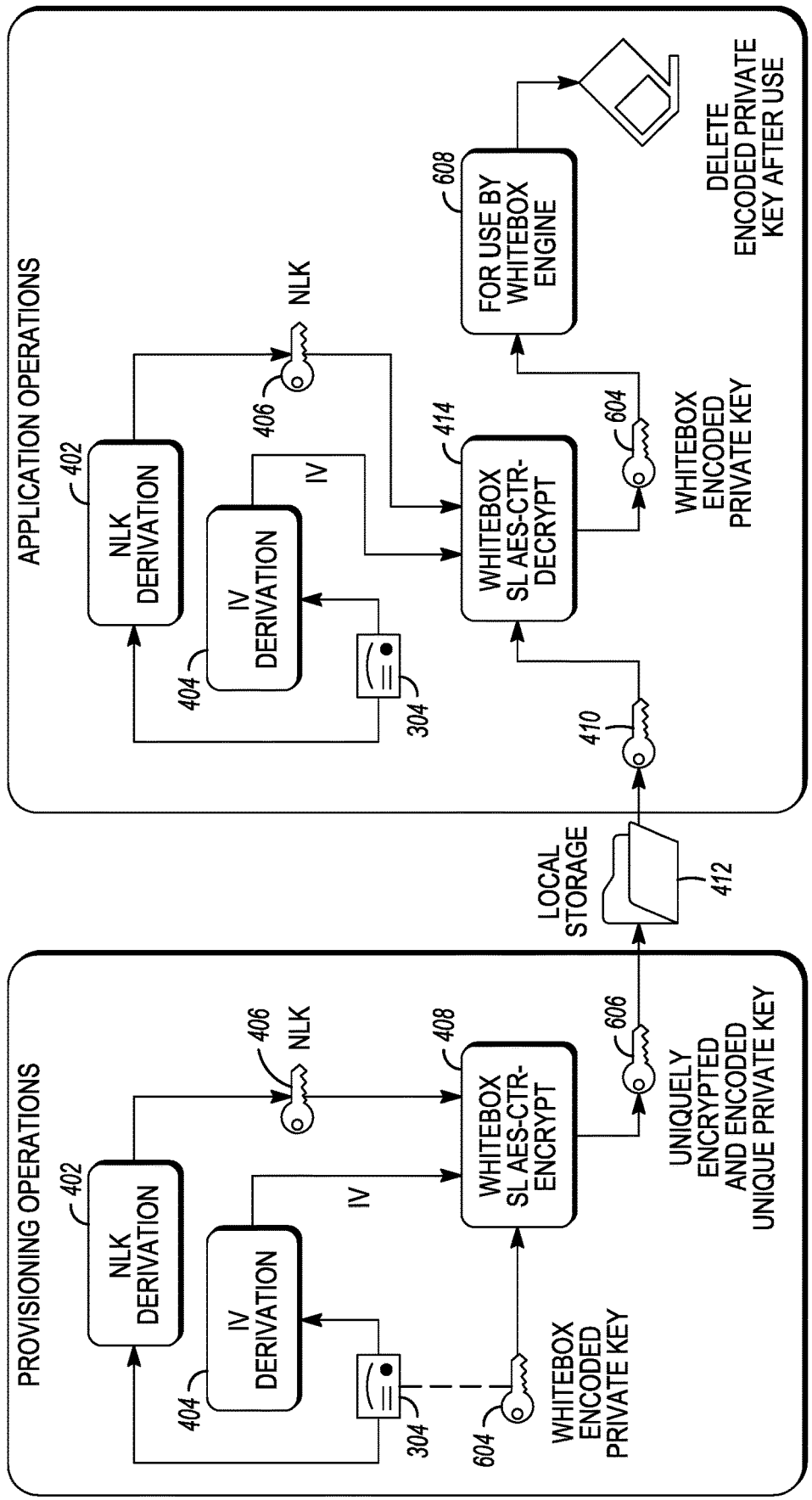
FIG. 9 is a diagram illustrating the second phase of credential provisioning illustrated in FIG. 8, and the decryption and use of an encoded version of the private key.

FIGS. 8 and 9 are diagrams illustrating another alternative embodiment of the provisioning and use of the private key. This alternative embodiment is similar to the embodiment illustrated in FIG. 6, but while the embodiment illustrated in FIG. 6 discloses the encoding of the private key 302 being performed by the PKI client 106 during the second phase of provisioning (thus at least temporarily storing the clear private key 302 in the PKI client), the embodiment illustrated in FIG. 8 discloses such encoding of the private key 302 in the key encryptor 301 before transmission of that encoded and encrypted private key 606 to the PKI client 106. Hence, in this embodiment, the clear private key 302 is never exposed in the PKI client 106, even during provisioning.

FIG. 8 is a diagram illustrating the first phase of credential provisioning in this embodiment. As illustrated, the private key 302 is encoded by encoder 602 before encryption by the global encryptor 308 for use by the whitebox cryptographic operation 608 that is to be performed by the PKI client 106.

The encoded private key 604 is encrypted according to the global encryption key 306 by global encryptor 308 to produce a globally encrypted encoded private key 802. The global encryption key 306 is encoded by encoder 602 to produce the encoded global key e[Gk] 312 for use by global whitebox decryptor 316. The encoded global key e[Gk] 312, the globally encrypted and encoded private key 802, and the digital certificate 304 are then provided to the PKI client 106.

The PKI client 106 decrypts the globally encrypted and encoded private key 802 using the global whitebox decryptor 316 and the encoded global key 312 to reproduce the encoded private key 604.

FIG. 9 is a diagram illustrating the second phase of credential provisioning illustrated in FIG. 8, and the decryption and use of an encoded version 604 of the private key 302. As described above, the operations illustrated in FIG. 9 are essentially the same as those illustrated in FIG. 6, except that the encoding of the private key 302 for use by the further whitebox cryptographic operation 608 has been performed by the key encryptor 301 rather than in the PKI client 106 as a part of the second phase of key provisioning.

Hence, the decryption operation provided by whitebox decryptor 316 (on FIG. 8) results in an encoded private key 604 instead of a simply the plaintext private key 302. The PKI client 106 receives the encoded private key 604 along with the digital certificate 304, and generates the NLK 406 and IV using the digital certificate 304, and applies the NLK 406 and IV to whitebox encryptor 408 to encrypt the encoded private key 604, thereby generating the encrypted encode private key 606, which is stored for later use in local storage 412.

When the private key is desired, the encrypted encoded private key 606 is retrieved from local storage, and node locking information is derived from the digital certificate using the techniques outlined above. The locked whitebox decryptor 414 uses this re-derived node locking information to decrypt the encrypted encoded private key 606 to produce the encoded private key 604. The encoded private key can thereafter be used to perform the whitebox cryptographic operation 608 for which it was encoded.

Hardware Environment

Figure 10:
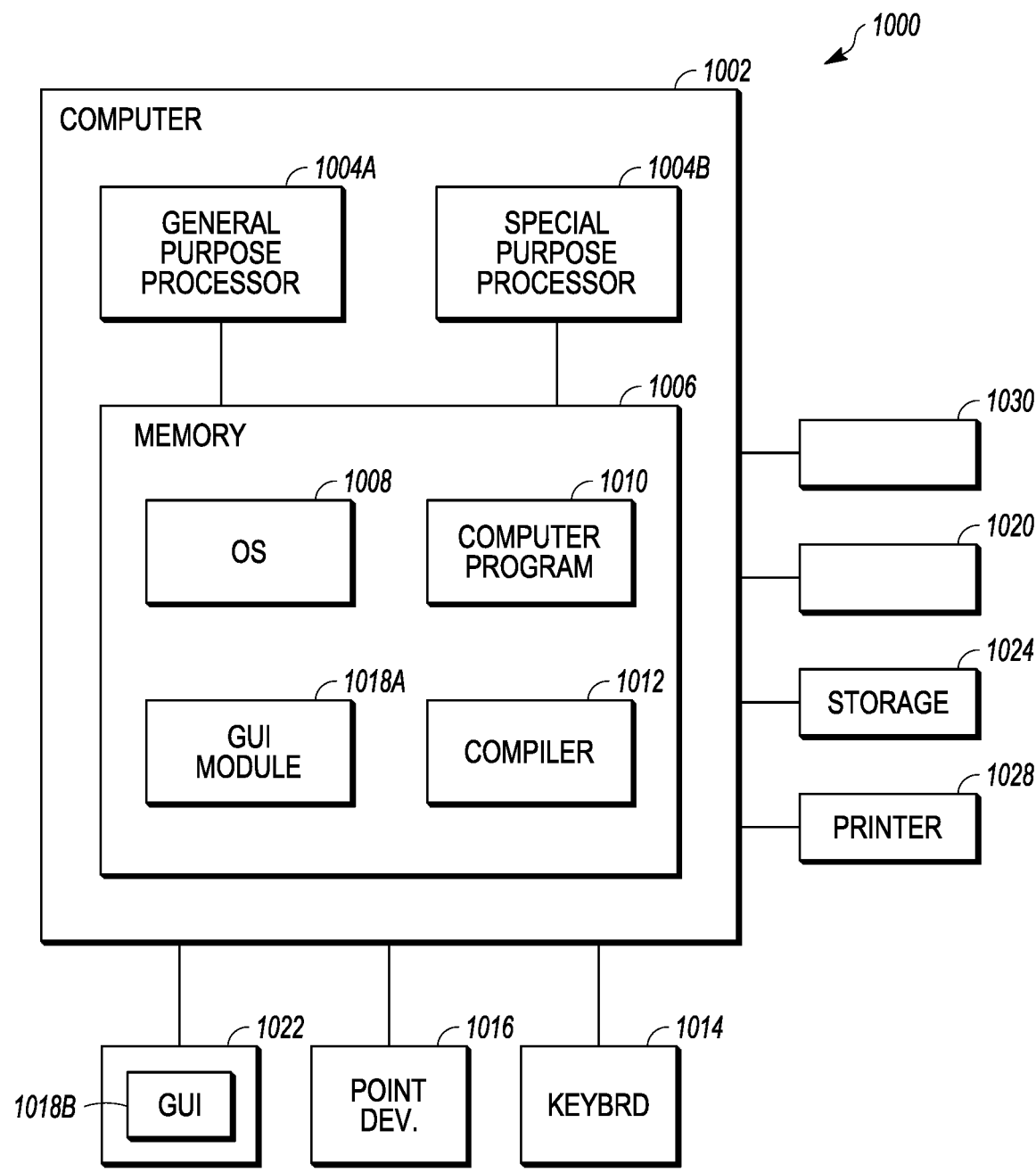
FIG. 10 illustrates an exemplary computer system that could be used to implement processing elements of the geolocation system.

FIG. 10 illustrates an exemplary computer system 1000 that could be used to implement processing elements of the above disclosure, including the offline key generation facility 102, the provisioning system 104, repository 135 and PKI client 106 The computer 1002 comprises a processor 1004 and a memory, such as random access memory (RAM) 1006. The computer 1002 is operatively coupled to a display 1022, which presents images such as windows to the user on a graphical user interface 1018B. The computer 1002 may be coupled to other devices, such as a keyboard 1014, a mouse device 1016, a printer 1028, etc. Of course, those skilled in the art will recognize that any combination of the above components, or any number of different components, peripherals, and other devices, may be used with the computer 1002.

Generally, the computer 1002 operates under control of an operating system 1008 stored in the memory 1006, and interfaces with the user to accept inputs and commands and to present results through a graphical user interface (GUI) module 1018A. Although the GUI module 1018B is depicted as a separate module, the instructions performing the GUI functions can be resident or distributed in the operating system 1008, the computer program 1010, or implemented with special purpose memory and processors. The computer 1002 also implements a compiler 1012 which allows an application program 1010 written in a programming language such as COBOL, C++, FORTRAN, or other language to be translated into processor 1004 readable code. After completion, the application 1010 accesses and manipulates data stored in the memory 1006 of the computer 1002 using the relationships and logic that was generated using the compiler 1012. The computer 1002 also optionally comprises an external communication device such as a modem, satellite link, Ethernet card, or other device for communicating with other computers.

In one embodiment, instructions implementing the operating system 1008, the computer program 1010, and the compiler 1012 are tangibly embodied in a computer-readable medium, e.g., data storage device 1020, which could include one or more fixed or removable data storage devices, such as a zip drive, floppy disc drive 1024, hard drive, CD-ROM drive, tape drive, etc. Further, the operating system 1008 and the computer program 1010 are comprised of instructions which, when read and executed by the computer 1002, causes the computer 1002 to perform the operations herein described. Computer program 1010 and/or operating instructions may also be tangibly embodied in memory 1006 and/or data communications devices 1030, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure. The foregoing description of the preferred embodiment has been presented for the purposes of illustration and description.

For example, while the particular encryption/decryption techniques disclosed herein can be used to perform the indicated operations (for example, AES-CTR and AES CBC), other encryption/decryption techniques can be used (for example, triple data encryption standard—cipher block chaining (3DES-CBC) and triple data encryption standard electronic code book (3DES-ECB) or other techniques).

Although the foregoing has been described with respect to the provision of a private key or other credential to a PKI client 106, the described systems and methods may be used to protect user/customer private data handled by cloud applications, to protect secrets such as passwords, Wi-Fi keys and the like, and to protect user credentials entered in a browser through a portal application.

A method of performing an cryptographic operation according to a public key infrastructure (PKI) client-unique private key is disclosed. In one embodiment, the method comprises: providing, in a PKI client, a whitebox implementation. The whitebox implementation includes: a global whitebox decryptor; a locked whitebox encryptor, the locked whitebox encryptor locked to the PKI client according to a PKI client unique ID; a locked whitebox decryptor, the locked whitebox decryptor locked to the PKI client according to the PKI client unique ID. The method also includes receiving: an encoded global encryption key, the private key encrypted according to the global encryption key, a digital certificate cryptographically associated with the private key. The method also includes decrypting the encrypted private key according to the encoded global encryption key using the global whitebox decryptor; deriving node locking information from the digital certificate, uniquely re-encrypting the private key according to the node locking information by the locked whitebox encryptor, re-deriving the node locking information from the digital certificate, decrypting the re-encrypted private key according to the re-derived node locking information by the locked whitebox decryptor, and performing the cryptographic operation according to the decrypted private key.

Implementations may include one or more of the following features.

Any of the above methods wherein: the whitebox implementation further may include: a whitebox cryptographic operation; and an encoder; uniquely re-encrypting the private key according to the node locking information by the locked whitebox encryptor may include: encoding, by the encoder, the private key for use by the whitebox cryptographic operation; and uniquely re-encrypting the private key according to the node locking information and the encoded private key by the locked whitebox encryptor; and performing the cryptographic operation according to the decrypted private key may include: performing the whitebox cryptographic operation according to the encoded private key.

Any of the above methods wherein: the whitebox implementation further may include: a whitebox cryptographic operation; the global whitebox decryptor further encodes the private key for use by the whitebox cryptographic operation; uniquely re-encrypting the private key according to the node locking information by the locked whitebox encryptor may include: uniquely re-encrypting the encoded private key according to the node locking information by the locked whitebox encryptor; and performing the cryptographic operation according to the decrypted private key may include: performing the cryptographic operation according to the encoded private key.

Any of the above methods wherein: the whitebox implementation further may include: a whitebox cryptographic operation; the received private key is encoded before the encryption according to the global encryption key, the private key being encoded for use by the whitebox cryptographic operation; decrypting the encrypted private key according to the encoded global encryption key using the global whitebox decryptor may include: decrypting the encrypted encoded private key according to the encoded encryption key using the global whitebox decryptor; uniquely re-encrypting the private key according to the node locking information by the locked whitebox encryptor may include: uniquely re-encrypting the encoded private key according to the node locking information by the locked whitebox encryptor; decrypting the re-encrypted private key according to the re-derived node locking information by the locked whitebox decryptor may include: decrypting the re-encrypted encoded private key according to the re-derived node locking information by the locked whitebox decryptor; and performing the cryptographic operation according to the decrypted private key may include: performing the whitebox cryptographic operation according to the encoded private key.

Any of the above methods wherein: the node locking information may include: a node locking key.

Any of the above methods wherein: the method further comprises: generating a cryptographic hash of at least a portion of the digital certificate; and decrypting at least a portion of the hash of the at least a portion of the digital certificate using the encoded global encryption key and global whitebox decryptor to produce the node locking key.

Any of the above methods wherein: the node locking information further may include an initialization vector; and the initialization vector is generated based on at least a portion of the cryptographic hash of the at least a portion of the digital certificate; and the initialization vector is derived in a whitebox-encoded form.

Any of the above methods wherein: the node locking key is derived in a white-box encoded form.

Any of the above methods wherein: the PKI client unique ID is derived from fingerprint data collected from at least one characteristic of the PKI client, the at least one characteristic selected from a group may include a software characteristic and hardware characteristic.

In another embodiment, the method securely provides a PKI-client unique private key for performing a cryptographic operation. In one embodiment, the method comprises encrypting the private key according to a global encryption key Gk; encoding the global encryption key Gk for use with a global whitebox decryptor executing at a PKI client; and providing the encoded global encryption key Gk and the globally encrypted private key to the PKI client for decryption by the global whitebox decryptor, re-encryption by a locked whitebox encryptor executing on the PKI client and locked to the PKI client before storage, and decryption by a locked whitebox decryptor executing on the PKI client and locked to the PKI client before retrieval and use of the private key to perform the cryptographic operation.

Implementations may include one or more of the following features.

Any of the above methods wherein: the cryptographic operation is whitebox cryptographic operation performed by the PKI client; the decrypted private key is encoded for use by the whitebox cryptographic operation after decryption by the global whitebox decryptor and before re-encryption by the locked whitebox encryptor; and the encoded private key is used to perform the cryptographic operation.

Any of the above methods wherein: the cryptographic operation is whitebox cryptographic operation performed by the PKI client; the global whitebox decryptor decrypts the globally encrypted private key and encodes the private key; and providing the encoded global encryption key Gk and the globally encrypted private key to the PKI client for decryption by the global whitebox decryptor, re-encryption by a locked whitebox encryptor executing on the PKI client and locked to the PKI client before storage, and decryption by a locked whitebox decryptor executing on the PKI client and locked to the PKI client before retrieval and use of the private key to perform the cryptographic operation comprises: providing the encoded global encryption key Gk and the encoded globally encrypted private key to the PKI client for decryption by the global whitebox decryptor, re-encryption by a locked whitebox encryptor executing on the PKI client and locked to the PKI client before storage, and decryption by a locked whitebox decryptor executing on the PKI client and locked to the PKI client before retrieval and use of the encoded private key to perform the whitebox cryptographic operation.

Any of the above methods wherein: the cryptographic operation is whitebox cryptographic operation performed by the PKI client; the method further comprises: encoding the private key for use by the whitebox cryptographic operation; encrypting the private key according to a global encryption key Gk comprises: encrypting the encoded private key according to the global encryption key Gk; and providing the encoded global encryption key Gk and the globally encrypted encoded private key to the PKI client for decryption by the global whitebox decryptor, re-encryption by a locked whitebox encryptor executing on the PKI client and locked to the PKI client before storage, and decryption by a locked whitebox decryptor executing on the PKI client and locked to the PKI client before retrieval and use of the private key to perform the cryptographic operation.

Another embodiment is evidenced by an apparatus for performing an cryptographic operation according to a device-unique private key. In one embodiment, the apparatus comprises a processor; and a memory, communicatively coupled to the processor, the memory storing processor instructions comprising processor instructions for: providing, in a PKI client, a whitebox implementation, the whitebox implementation comprising: a global whitebox decryptor; a locked whitebox encryptor, the locked whitebox encryptor locked to the PKI client according to a PKI client unique ID; a locked whitebox decryptor, the locked whitebox decryptor locked to the PKI client according to the PKI client unique ID. The processor instructions further comprise processor instructions for receiving: an encoded global encryption key; the private key encrypted according to the global encryption key; and a digital certificate cryptographically associated with the private key. The instructions further comprise instructions for decrypting the encrypted private key according to the encoded global encryption key using the global whitebox decryptor; deriving node locking information from the digital certificate; uniquely re-encrypting the private key according to the node locking information by the locked whitebox encryptor; re-deriving the node locking information from the digital certificate; decrypting the re-encrypted private key according to the re-derived node locking information by the locked whitebox decryptor; and performing the cryptographic operation according to the decrypted private key.

Implementations may include one or more of the following features.

Any apparatus or combination above, wherein: the whitebox implementation further comprises: a whitebox cryptographic operation; and an encoder; the processor instructions for uniquely re-encrypting the private key according to the node locking information by the locked whitebox encryptor comprises processor instructions for: encoding, by the encoder, the private key for use by the whitebox cryptographic operation; and uniquely re-encrypting the private key according to the node locking information and the encoded private key by the locked whitebox encryptor; and the processor instructions for performing the cryptographic operation according to the decrypted private key comprises processor instructions for: performing the whitebox cryptographic operation according to the encoded private key.

Any apparatus or combination above, wherein: the whitebox implementation further comprises a whitebox cryptographic operation; the global whitebox decryptor further encodes the private key for use by the whitebox cryptographic operation; the processor instructions for uniquely re-encrypting the private key according to the node locking information by the locked whitebox encryptor comprises processor instructions for: uniquely re-encrypting the encoded private key according to the node locking information by the locked whitebox encryptor; and the processor instructions for performing the cryptographic operation according to the decrypted private key comprises processor instructions for: performing the cryptographic operation according to the encoded private key.

Any apparatus or combination above, wherein: the whitebox implementation further comprises: a whitebox cryptographic operation; the received private key is encoded before the encryption according to the global encryption key, the private key being encoded for use by the whitebox cryptographic operation; the processor instructions for decrypting the encrypted private key according to the encoded global encryption key using the global whitebox decryptor comprises processor instructions for: decrypting the encrypted encoded private key according to the encoded encryption key using the global whitebox decryptor; the processor instructions for uniquely re-encrypting the private key according to the node locking information by the locked whitebox encryptor comprises processor instructions for: uniquely re-encrypting the encoded private key according to the node locking information by the locked whitebox encryptor; the processor instructions for decrypting the re-encrypted private key according to the re-derived node locking information by the locked whitebox decryptor comprises processor instructions for: decrypting the re-encrypted encoded private key according to the re-derived node locking information by the locked whitebox decryptor; and the processor instructions for performing the cryptographic operation according to the decrypted private key comprises processor instructions for: performing the whitebox cryptographic operation according to the encoded private key.

Any apparatus or combination above, wherein: the node locking information comprises: a node locking key.

Any apparatus or combination above, wherein: the processor instructions further comprise processor instructions for: generating a cryptographic hash of at least a portion of the digital certificate; and decrypting at least a portion of the hash of the at least a portion of the digital certificate using the encoded global encryption key and global whitebox decryptor to produce the node locking key.

Another embodiment is evidenced by an apparatus for performing an cryptographic operation according to a PKI client-unique private key, comprising: a processor; a memory, the memory storing processor instructions including processor instructions for: encrypting the private key according to a global encryption key Gk; encoding the global encryption key Gk for use with a global whitebox decryptor executing at a PKI client; and providing the encoded global encryption key Gk and the globally encrypted private key to the PKI client for decryption by the global whitebox decryptor, re-encryption by a locked whitebox encryptor executing on the PKI client and locked to the PKI client before storage, and decryption by a locked whitebox decryptor executing on the PKI client and locked to the PKI client before retrieval and use of the private key to perform the cryptographic operation.

It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of performing an cryptographic operation according to a public key infrastructure (PKI) client-unique private key, comprising:
    providing, in a PKI client, a whitebox implementation, the whitebox implementation comprising:
        a global whitebox decryptor;
        a locked whitebox encryptor, the locked whitebox encryptor locked to the PKI client according to a PKI client unique ID;
        a locked whitebox decryptor, the locked whitebox decryptor locked to the PKI client according to the PKI client unique ID;
    receiving:
        an encoded global encryption key;
        the private key encrypted according to the global encryption key;
        a digital certificate cryptographically associated with the private key;
    decrypting the encrypted private key according to the encoded global encryption key using the global whitebox decryptor;
    deriving node locking information from the digital certificate;
    uniquely re-encrypting the private key according to the node locking information by the locked whitebox encryptor;
    re-deriving the node locking information from the digital certificate;
    decrypting the re-encrypted private key according to the re-derived node locking information by the locked whitebox decryptor; and
    performing the cryptographic operation according to the decrypted private key.

2. The method of claim 1, wherein:
    the whitebox implementation further comprises:
        a whitebox cryptographic operation; and
        an encoder;
    uniquely re-encrypting the private key according to the node locking information by the locked whitebox encryptor comprises:
        encoding, by the encoder, the private key for use by the whitebox cryptographic operation; and
        uniquely re-encrypting the private key according to the node locking information and the encoded private key by the locked whitebox encryptor; and
    performing the cryptographic operation according to the decrypted private key comprises:
        performing the whitebox cryptographic operation according to the encoded private key.

3. The method of claim 1, wherein:
    the whitebox implementation further comprises:
        a whitebox cryptographic operation;
        the global whitebox decryptor further encodes the private key for use by the whitebox cryptographic operation;

uniquely re-encrypting the private key according to the node locking information by the locked whitebox encryptor comprises:
uniquely re-encrypting the encoded private key according to the node locking information by the locked whitebox encryptor; and
performing the cryptographic operation according to the decrypted private key comprises:
performing the cryptographic operation according to the encoded private key.

4. The method of claim 1, wherein:
the whitebox implementation further comprises:
a whitebox cryptographic operation;
the received private key is encoded before the encryption according to the global encryption key, the private key being encoded for use by the whitebox cryptographic operation;
decrypting the encrypted private key according to the encoded global encryption key using the global whitebox decryptor comprises:
decrypting the encrypted encoded private key according to the encoded global encryption key using the global whitebox decryptor;
uniquely re-encrypting the private key according to the node locking information by the locked whitebox encryptor comprises:
uniquely re-encrypting the encoded private key according to the node locking information by the locked whitebox encryptor;
decrypting the re-encrypted private key according to the re-derived node locking information by the locked whitebox decryptor comprises:
decrypting the re-encrypted encoded private key according to the re-derived node locking information by the locked whitebox decryptor; and
performing the cryptographic operation according to the decrypted private key comprises:
performing the whitebox cryptographic operation according to the encoded private key.

5. The method of claim 1, wherein the node locking information comprises:
a node locking key.

6. The method of claim 5, further comprising:
generating a cryptographic hash of at least a portion of the digital certificate; and
decrypting at least a portion of the cryptographic hash of the at least a portion of the digital certificate using the encoded global encryption key and global whitebox decryptor to produce the node locking key.

7. The method of claim 5, where the node locking key is derived in a white-box encoded form.

8. The method of claim 6, wherein:
the node locking information further comprises an initialization vector; and
the initialization vector is generated based on at least a portion of the cryptographic hash of the at least a portion of the digital certificate; and
the initialization vector is derived in a whitebox-encoded form.

9. The method of claim 1, wherein the PKI client unique ID is derived from fingerprint data collected from at least one characteristic of the PKI client, the at least one characteristic selected from a group comprising a software characteristic and hardware characteristic.

10. A method of securely providing a PKI-client unique private key for performing a cryptographic operation, comprising:

encrypting the private key according to a global encryption key Gk;
encoding the global encryption key Gk for use with a global whitebox decryptor executing at a PKI client; and
providing the encoded global encryption key Gk and the globally encrypted private key to the PKI client for decryption by the global whitebox decryptor, re-encryption by a locked whitebox encryptor executing on the PKI client and locked to the PKI client before storage, and decryption by a locked whitebox decryptor executing on the PKI client and locked to the PKI client before retrieval and use of the private key to perform the cryptographic operation.

11. The method of claim 10, wherein:
the cryptographic operation is whitebox cryptographic operation performed by the PKI client;
the decrypted private key is encoded for use by the whitebox cryptographic operation after decryption by the global whitebox decryptor and before re-encryption by the locked whitebox encryptor; and
the encoded private key is used to perform the cryptographic operation.

12. The method of claim 10, wherein:
the cryptographic operation is whitebox cryptographic operation performed by the PKI client;
the global whitebox decryptor decrypts the globally encrypted private key and encodes the private key; and
providing the encoded global encryption key Gk and the globally encrypted private key to the PKI client for decryption by the global whitebox decryptor, re-encryption by a locked whitebox encryptor executing on the PKI client and locked to the PKI client before storage, and decryption by a locked whitebox decryptor executing on the PKI client and locked to the PKI client before retrieval and use of the private key to perform the cryptographic operation comprises:
providing the encoded global encryption key Gk and the globally encrypted private key to the PKI client for decryption by the global whitebox decryptor, re-encryption by a locked whitebox encryptor executing on the PKI client and locked to the PKI client before storage, and decryption by a locked whitebox decryptor executing on the PKI client and locked to the PKI client before retrieval and use of the encoded private key to perform the whitebox cryptographic operation.

13. The method of claim 10, wherein:
the cryptographic operation is whitebox cryptographic operation performed by the PKI client;
the method further comprises:
encoding the private key for use by the whitebox cryptographic operation;
encrypting the private key according to a global encryption key Gk comprises:
encrypting the encoded private key according to the global encryption key Gk; and
providing the encoded global encryption key Gk and the globally encrypted encoded private key to the PKI client for decryption by the global whitebox decryptor, re-encryption by a locked whitebox encryptor executing on the PKI client and locked to the PKI client before storage, and decryption by a locked whitebox decryptor executing on the PKI client and locked to the PKI client before retrieval and use of the private key to perform the cryptographic operation.

14. An apparatus for performing an cryptographic operation according to a device-unique private key, comprising:
a processor;
a memory, communicatively coupled to the processor, the memory storing processor instructions comprising processor instructions for:
providing, in a PKI client, a whitebox implementation, the whitebox implementation comprising:
a global whitebox decryptor;
a locked whitebox encryptor, the locked whitebox encryptor locked to the PKI client according to a PKI client unique ID;
a locked whitebox decryptor, the locked whitebox decryptor locked to the PKI client according to the PKI client unique ID;
receiving:
an encoded global encryption key;
the private key encrypted according to the global encryption key;
a digital certificate cryptographically associated with the private key;
decrypting the encrypted private key according to the encoded global encryption key using the global whitebox decryptor;
deriving node locking information from the digital certificate;
uniquely re-encrypting the private key according to the node locking information by the locked whitebox encryptor;
re-deriving the node locking information from the digital certificate;
decrypting the re-encrypted private key according to the re-derived node locking information by the locked whitebox decryptor; and
performing the cryptographic operation according to the decrypted private key.

15. The apparatus of claim 14, wherein:
the whitebox implementation further comprises:
a whitebox cryptographic operation; and
an encoder;
the processor instructions for uniquely re-encrypting the private key according to the node locking information by the locked whitebox encryptor comprises processor instructions for:
encoding, by the encoder, the private key for use by the whitebox cryptographic operation; and
uniquely re-encrypting the private key according to the node locking information and the encoded private key by the locked whitebox encryptor; and
the processor instructions for performing the cryptographic operation according to the decrypted private key comprises processor instructions for:
performing the whitebox cryptographic operation according to the encoded private key.

16. The apparatus of claim 14, wherein:
the whitebox implementation further comprises:
a whitebox cryptographic operation;
the global whitebox decryptor further encodes the private key for use by the whitebox cryptographic operation;
the processor instructions for uniquely re-encrypting the private key according to the node locking information by the locked whitebox encryptor comprises processor instructions for:
uniquely re-encrypting the encoded private key according to the node locking information by the locked whitebox encryptor; and
the processor instructions for performing the cryptographic operation according to the decrypted private key comprises processor instructions for:
performing the cryptographic operation according to the encoded private key.

17. The apparatus of claim 14, wherein:
the whitebox implementation further comprises:
a whitebox cryptographic operation;
the received private key is encoded before the encryption according to the global encryption key, the private key being encoded for use by the whitebox cryptographic operation;
the processor instructions for decrypting the encrypted private key according to the encoded global encryption key using the global whitebox decryptor comprises processor instructions for:
decrypting the encrypted encoded private key according to the encoded global encryption key using the global whitebox decryptor;
the processor instructions for uniquely re-encrypting the private key according to the node locking information by the locked whitebox encryptor comprises processor instructions for:
uniquely re-encrypting the encoded private key according to the node locking information by the locked whitebox encryptor;
the processor instructions for decrypting the re-encrypted private key according to the re-derived node locking information by the locked whitebox decryptor comprises processor instructions for:
decrypting the re-encrypted encoded private key according to the re-derived node locking information by the locked whitebox decryptor; and
the processor instructions for performing the cryptographic operation according to the decrypted private key comprises processor instructions for:
performing the whitebox cryptographic operation according to the encoded private key.

18. The apparatus of claim 14, wherein the node locking information comprises:
a node locking key.

19. The apparatus of claim 18, wherein the processor instructions further comprise processor instructions for:
generating a cryptographic hash of at least a portion of the digital certificate; and
decrypting at least a portion of the cryptographic hash of the at least a portion of the digital certificate using the encoded global encryption key and global whitebox decryptor to produce the node locking key.

20. An apparatus for performing an cryptographic operation according to a public key infrastructure (PKI) client-unique private key, comprising:
a processor;
a memory, the memory storing processor instructions including processor instructions for:
encrypting the private key according to a global encryption key Gk;
encoding the global encryption key Gk for use with a global whitebox decryptor executing at a PKI client; and
providing the encoded global encryption key Gk and the globally encrypted private key to the PKI client for decryption by the global whitebox decryptor, re-encryption by a locked whitebox encryptor executing on the PKI client and locked to the PKI client before storage, and decryption by a locked whitebox decryptor executing on the PKI client and locked to the PKI client before retrieval and use of the private key to perform the cryptographic operation.

\* \* \* \* \*